United States Patent [19]

Koch, III

[11] Patent Number: 5,375,882
[45] Date of Patent: Dec. 27, 1994

[54] MIST SUPPRESSANT PANELS FOR A VEHICLE AND A METHOD OF SUPPRESSING MIST

[76] Inventor: Stanley G. Koch, III, 1340 W. Sun Oil Rd., Gladwin, Mich. 48624

[21] Appl. No.: 2,936

[22] Filed: Jan. 11, 1993

[51] Int. Cl.⁵ ............................................. B62D 25/16
[52] U.S. Cl. ................................. 280/851; 280/848; 296/180.1
[58] Field of Search ................. 280/851, 848, 849; D12/185; 296/180.1, 180.4

[56] References Cited

U.S. PATENT DOCUMENTS

| | | | |
|---|---|---|---|
| 1,228,211 | 5/1917 | Holland | 280/851 |
| 2,683,612 | 7/1954 | Bacino | 280/851 |
| 3,632,137 | 1/1972 | Jossy | 280/851 |
| 3,743,343 | 7/1973 | Grote, Sr. et al. | 280/851 |
| 3,834,732 | 9/1974 | Schons | 280/851 |
| 3,869,617 | 3/1975 | Gaussoin et al. | 280/851 |
| 3,899,192 | 8/1975 | Reddaway | 280/851 |
| 4,012,053 | 3/1977 | Bode | 280/851 |
| 4,013,302 | 3/1977 | Oswald | 280/851 |
| 4,089,537 | 5/1978 | Pralutsky | 280/851 |
| 4,325,563 | 4/1982 | Brandon et al. | 280/851 |
| 4,334,694 | 6/1982 | Iwanicki | 280/851 |
| 4,372,570 | 2/1983 | Goodall | 280/851 |
| 4,564,204 | 1/1986 | Sullivan et al. | 280/851 |
| 4,585,242 | 4/1986 | Sparks | 280/851 |
| 4,627,631 | 12/1986 | Sherman | 280/851 |
| 4,796,905 | 1/1989 | Sullivan | 280/851 |
| 5,022,680 | 6/1991 | Eklund, Jr. | 280/851 |
| 5,080,397 | 1/1992 | Metcalf | 280/851 |

FOREIGN PATENT DOCUMENTS

| | | | |
|---|---|---|---|
| 2918830 | 11/1980 | Germany | 280/851 |
| 2100206 | 12/1982 | United Kingdom | 280/851 |
| 2172256 | 9/1986 | United Kingdom | 280/851 |

Primary Examiner—Brian L. Johnson
Assistant Examiner—Peter C. English
Attorney, Agent, or Firm—Learman & McCulloch

[57] ABSTRACT

The mist suppressant panel system (10) mounted to the rear of each vehicle wheel and tire (12 and 16) includes a mounting bar (26) attached to the vehicle frame (18). Four mist suppressant panels (28) are attached to the mounting bar (26). The mist suppressant panels (28) each have a mist suppressant surface (34) with an outboard edge (40), an inboard edge (82), a top edge (84), and a bottom edge (86). The mist suppressant surface (34) extends downwardly and rearwardly from the top edge (84) at an angle of about ten degrees from a vertical plane. The mist suppressant surface also extends rearwardly and inwardly from the outboard edge (40) at an angle of about forty-five degrees from a vertical plane that is transverse to the direction of vehicle travel. A plurality of parallel vanes (36) extend outwardly from the mist suppressant surface (34) to form grooves (38) that absorb kinetic energy from water drops and condense water drops. Spoilers (48) can be added to the vanes (36), if desired. The vanes (36) can also be segmented. The mist suppressant panels (28) suck air and entrained water drops in from the side of a vehicle (14) and direct air and consensed water drops in toward the center of the vehicle and down toward the road surface.

18 Claims, 4 Drawing Sheets

MIST SUPPRESSANT PANELS FOR A VEHICLE AND A METHOD OF SUPPRESSING MIST

TECHNICAL FIELD

The invention relates to mist suppressing panels for a vehicle and more particularly to a plurality of air directive panels behind vehicle wheels which collect spray from vehicle tires, separate some liquid from entrained air and liquid and direct liquid, air and liquid droplets mixed with air toward the road and toward the center of the vehicle. The air directive surface of the panels may have grooves or other surface features for condensing mist.

BACKGROUND OF THE INVENTION

As automotive vehicles travel on wet road surfaces, the wheels and tires splash water and mud from the road surface. The tires also pick up water that tends to adhere to tire surfaces. The water that adheres to tire surfaces is thrown off the tire surfaces by centrifugal force. Water that is thrown from tires by centrifugal force is thrown radially outward relative to the rotating tire surface. The bulk of this water is thrown to the rear and up. The water forms droplets as it separates from the surface of a tire. The droplets of water vary in size. The portion of water thrown from tires that is in minute droplets increases as vehicle speed increases. It is also believed that the portion of the water that is in minute droplets increases as vehicle size and weight increase. Minute droplets of water that are thrown from vehicle tires by centrifugal force can become entrained in air. Entrained air and minute droplets of water produce a heavy wet fog, some of which floats up and out from the sides of the vehicle which created the fog. Heavy wet fog, individual water drops that spray from vehicle tires, and water that is splashed from road surfaces by vehicle tires can reduce visibility for other vehicles. At times, the windshield wipers on vehicles traveling into the heavy wet fog, spray of water drops, and splashed water and mud can become overloaded making it impossible to see through the water and past the vehicle windshield. These poor visibility problems are particularly serious for vehicles that are meeting each other on roads with two-way traffic and for a vehicle that is passing or being passed by another vehicle traveling the same direction.

The need to eliminate the visibility problems created by vehicle tire splash and tire spray has been recognized for many years. The U.S. Department of Transportation drafted rules requiring spray suppressant systems on large vehicles, such as trucks. The rules were not put into force when it became clear that effective technology has not been available to solve the problem.

SUMMARY OF THE INVENTION

An object of the invention is to provide improved vehicle mist suppressant panels which suppress splashed water and mud, water droplets that spray from vehicle wheels, and minute water droplets that become entrained in air as a vehicle travels on a wet road surface.

Another object of the invention is to provide vehicle mist suppressant panels that increase the surface area for catching and condensing water that is splashed or thrown from vehicle tires.

A further object of the invention is to provide vehicle mist suppressant panels which direct water that is splashed or thrown from vehicle wheels away from the path of other vehicles that are traveling on the same road.

A still further object of the invention is to provide vehicle mist suppressant panels that are durable and that are not prone to damage by ice and snow.

The mist suppressant panel systems include mounting bars mounted on the vehicle frame to the rear of vehicle tires. A mounting bar extends rearwardly and horizontally from each vehicle tire. A plurality of individual mist suppressant panels are secured to the mounting bar.

The mist suppressant panels are secured to the mounting bar so that each panel is held in a substantially fixed or semi-fixed position relative to the vehicle frame. Each of the panels has a condensing surface that is in the path of water droplets that are thrown upwardly and rearwardly from a tire. The condensing surface extends downwardly and rearwardly at an angle of about ten degrees from a vertical plane that passes through the top edge of the mist suppressant panel. The condensing surface also extends inwardly toward the center of the vehicle, and rearwardly at an angle of about forty-five degrees from a vertical plane that is transverse to the forward direction of vehicle movement.

The condensing surface of the panels is configured to condense mist that impinges on the surface. One condensing surface that works well includes a series of parallel vanes that extend forwardly from a flat support surface and that extend inwardly toward the center of the vehicle and slightly downwardly from horizontal. The vanes that form a condensing surface with ridges and grooves have been found to be very effective at catching spray and mist and condensing it back to large water drops. The vanes can have small spoilers added which extend outwardly from the vane surfaces and at an angle across the path of air and water along the grooves to create additional turbulence if desired. The vanes can also be segmented, if desired. Segmented vanes and vanes with small spoilers create additional turbulence which improves mist and spray condensation. Other panels may have special mist suppressant materials attached that are designed for specific applications giving consideration to predominate climates or terrain.

The panels are preferably made from a molded flexible foam material with a water impervious tough flexible outer covering. A metal mounting bracket can be molded inside the foam material and protrudes from an upper edge of each panel. The portion of the mounting bracket that protrudes from the upper edge of each panel is a flat plate-like member with tabs on each free corner. The flat plate-like member is inserted through a slot in the mounting bar. After the plate-like member is inserted into the slot in the mounting bar as far as it will go, the tabs are bent out of the plane of the plate-like member, thereby locking the panel member to the mounting bar.

A mounting bracket made from a thermoplastic resin can be molded inside the foam material that forms the panel in place of the metal mounting bracket. With a thermoplastic mounting bracket the tabs that retain the mounting bracket in a mounting bar may be bent out of the plane of the plate-like member by heat. The tabs could also be formed bent out of the plane of the plate-like member. Tabs which are formed bent out of the plane of the plate-like member are forced into the plane of the plate-like member when they are forced through a slot in the mounting bar. Once the tabs pass through the slot, they return to their original shape.

The mounting bracket can also be attached directly to the mounting bar separate from the panels rather than being molded into the panels. The molded panels are then slipped over the mounting bracket. A resilient portion of each panel engages the mounting bracket to retain the panel on the mounting bracket.

The molded panels can also be attached directly to vehicle body panels if the vehicle has body panels which would accommodate such a connection. Another version of the mist suppressant panels has panels that are molded as an integral part of vehicle body panels.

The foregoing and other objects, features, and advantages of the invention will become apparent in the light of the following detailed description of an exemplary embodiment thereof, as illustrated in the accompanying drawing.

DESCRIPTION OF THE PREFERRED EMBODIMENT

Figure 1:
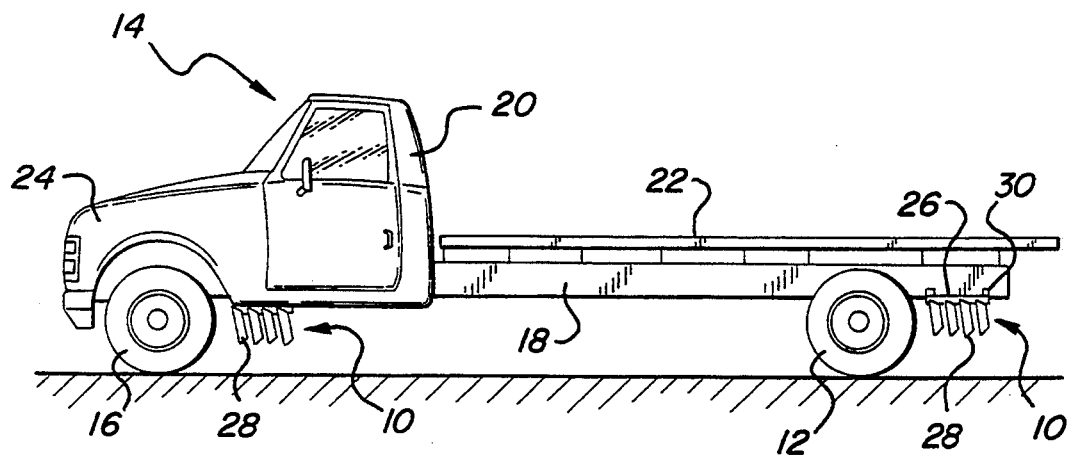
FIG. 1 is a side elevational view of an automotive vehicle with mist suppressant panels.
Figure 2:
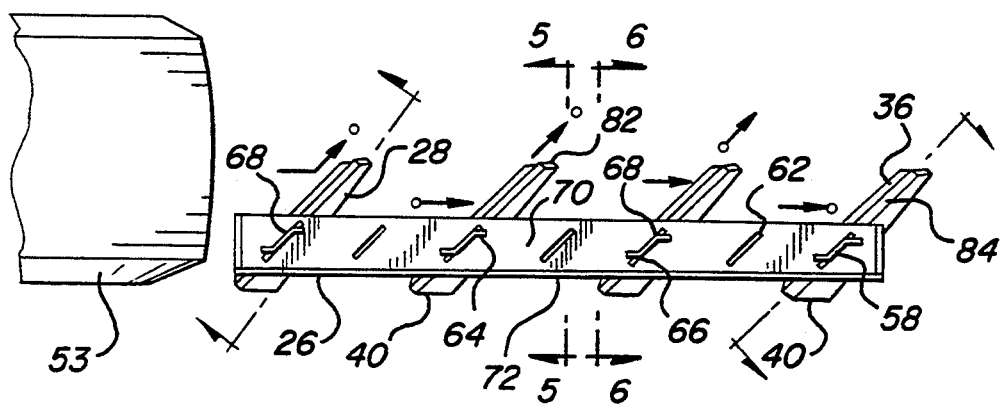
FIG. 2 is an enlarged plan view of a mist suppressant panel system with a mounting bar and four attached mist suppressant panels and a portion of a vehicle tire.

The mist suppressant panel system 10 is adaptable to mount on most motor vehicles to suppress water and water droplets that are thrown from the wheels and tires of vehicles traveling on wet road surfaces. As shown in FIG. 1, one of the mist suppressant panel systems 10 is associated with the left rear wheels and tire 12 of a truck 14 and another mist suppressant panel system is associated with the left front wheel and tire 16 of the truck. Mist suppressant panel systems 10 would also be associated with the wheels and tires on the right side of the truck 14. The truck 14 has a frame 18 supported by the rear wheels and tires 12 and the front wheels and tires 16. A cab 20 for the driver is mounted on the front portion of the frame 18. A cargo supporting flat bed 22 is attached to the rear portion of the frame 18.

The cab 20 of the truck 14 has fenders 24 partially enclosing the front wheels 16. Fenders 24 on vehicles limit the quantity of water that is thrown from wheels and tires 16 and into the path of other vehicles. Fenders 24 do not, however, prevent large quantities of mist entrained in turbulent air from billowing out the side of a fender and into the path of other vehicles.

The mist suppressant panel system 10 associated with the rear wheel and tire 12 includes a mounting bar 26 and four mist suppressant panels 28. The mounting bar 26 associated with the left rear wheel and tire 12 is attached to two tubes 30 by bolts 32 and 33 and pivot brackets 37. Bolts 32 attach pivot brackets 37 to the tubes 30. The bolts 33 pass through end plates 35 welded to the ends of the mounting bar 26 and through the pivot brackets 37. The bolts 33 allow the mounting bar 26 to be pivoted to the desired position and then lock the mounting bar in affixed position relative to the pivot brackets 37. The tubes 30 are secured to the frame 18 of the truck 14. The tubes 30 can be bolted or welded to the frame 18. The tubes 30 extend horizontally out from the frame 18 and are transverse to the direction of travel of the truck 14. A mounting bar 26 is attached to the bottom of the cab 20 of the truck 14 to support four mist suppressant panels 28 behind the left front wheel and tire 16. The mounting bar 26 under the cab 20 is up behind the lower outside edge of the cab and is not seen in FIG. 1. If desired, the mounting bar 26 for the mist suppressant panel system 10 associated with the front wheel and tire 16 could be attached directly to the frame 18 using mounting bar pivot brackets 37 fastened to tubes 30 rather than to the bottom of the cab 20. When used on passenger automobiles, the mounting bar 26 for a rear wheel and tire 12 could be attached directly to an automobile's body rather than directly to a frame using mounting bar pivot brackets 37.

A mounting bar 26 is mounted behind each tire and wheel on the truck 14. Four mist suppressant panels 28 are attached to each mounting bar 26 as shown in the drawing. The number of mist suppressant panels 28 that are attached to each mounting bar 26 can be increased or decreased as desired. It is believed that four mist suppressant panels 28 will provide sufficient water condensing area for most vehicles 14. Larger vehicles may employ more than four mist suppressant panels 28 to increase the total surface area available to condense mist and water drops. Less than four panels 28 can be used if they provide sufficient surface area and suppress a sufficient quantity of mist.

Figure 3:
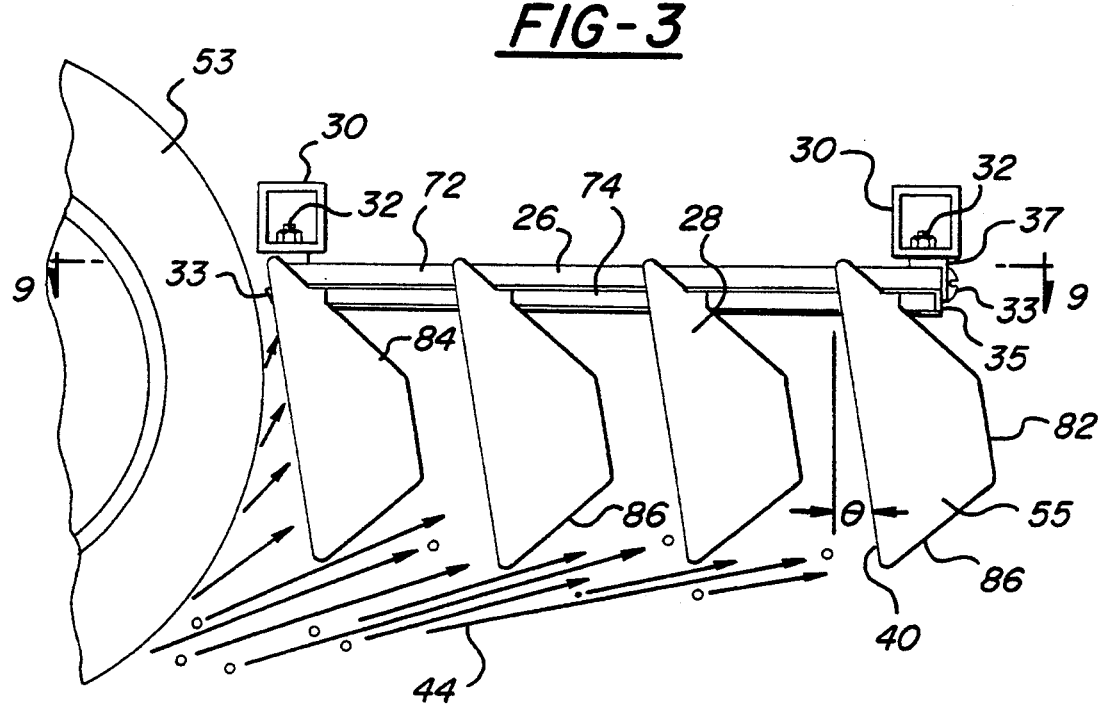
FIG. 3 is an enlarged side elevational view of the rear mist suppressant panel system including the mounting bar, attaching brackets, and a portion of a vehicle wheel shown in FIG. 1.
Figure 4:
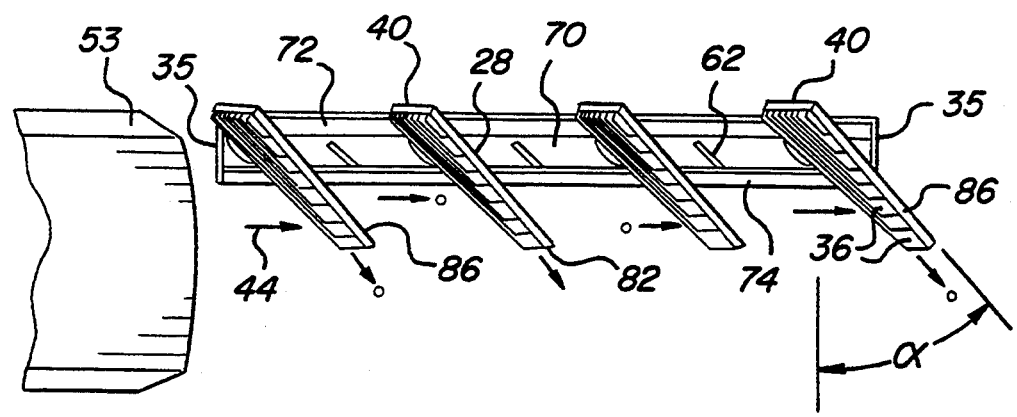
FIG. 4 is a bottom view of the mist suppressant panel system and a portion of a vehicle tire shown in FIGS. 2 and 3.

Each mist suppressant panel 28, as shown in FIGS. 2, 4, 6, 7, 9 and 10 has a generally flat mist suppressant surface 34. A plurality of vanes 36 extend outwardly from the generally flat mist suppressant surface 34 to form grooves 38 that condense minute water drops into larger drops and into water. The generally flat mist suppressant surface 34 extends downwardly and rearwardly at an angle $\theta$ of about ten degrees from a vertical plane that passes through the upper edge 84 of the mist suppressant panel 28 as shown in FIG. 3. The generally flat mist suppressant surface 34 also extends inwardly and rearwardly at an angle $\alpha$ of about forty-five degrees from a vertical transverse plane as shown in FIG. 4. The outboard edge 40 of each mist suppressant panel 28 is about in alignment with, and directly behind, the outboard tire wall 53 of the wheel and tire 12 or 16 that is directly in front of the mist suppressant panel. The mounting bar 26 extends rearwardly from a point adjacent to a wheel and tire 12 or 16 and outwardly away from the center of the vehicle so that the outboard edge 40 of the second mist suppressant panel 28 is positioned farther from the center of the vehicle than the outboard edge of the mist suppressant panel that is closest to a wheel and tire. The third mist suppressant panel 28 has an outboard edge 40 that is outboard of the first and second mist suppressant panels from the wheel and tire 12 or 16. The fourth mist suppressant panel 28 and any mist suppressant panels behind the fourth mist suppressant panel 28 have outboard edges 40 that are outboard of the mist suppressant panel immediately to their front. In this position forward movement of the truck 14 results in the mist suppressant surface 34 of the mist suppressant panel 28 closest to a wheel and tire 12 or 16 displacing air, water, and minute water drops entrained in air inwardly from the outboard edge 40 and toward the frame 18 and the center of the truck 14 and downwardly toward the road surface. This displacement of air, water drops and mist reduces air pressure adjacent to the outboard side 40 and on the side 55 of the mist suppressant panel 28 closest to the wheel and tire 12 or 16. The reduced air pressure at the outboard edge 40 of the mist suppressant panel 28 causes air adjacent to the outboard side of the truck 14 to move toward the mist suppressant panels 28. The air which moves toward the outboard edges 40 of the mist suppressant panels 28 carries water droplets and mist with it to positions where the mist suppressant panels 28 to the rear of the mist suppressant panel closest to a wheel and tire 12 or 16 further displace the air, water drops and mist inwardly toward the center of the vehicle and downwardly toward the road surface. The distance between adjacent mist suppressant panels 28 is important. If the mist suppressant panels are too close together or too far apart, the quantity of air, water drops, and mist that they displace is reduced. The distance required between the mist suppressant panels to obtain maximum suppression of mist depends upon vehicle aerodynamics, vehicle speed, tire size, vehicle weight, size of the mist suppressant panels 28, and other factors. The space between adjacent mist suppressant panels 28 is, therefore, set by trying various spacings between adjacent mist suppressant panels 28 and using the spacing which gives the best results. For most vehicles 14 and mist suppressant panels 28, a space of at least two (2) inches and not more than thirty (30) inches will suppress a substantial portion of the total mist created by the vehicle to which the mist suppressant panels are attached.

Water, water drops, mist, and air thrown up and radially outward by the wheel and tire 12 or 16, as shown by the arrows 44 in FIG. 3, tends to impinge upon the generally flat mist suppressant surface 34. The mist suppressant surface 34 directs the water, water drops, mist, and air received from the wheels and tires 12 and 16 inwardly toward the frame 18 and the center of the truck 14. The mist suppressant surface 34 also directs air, mist, water drops, and water downwardly toward the road surface the truck 14 is traveling on.

Flat surfaces are not satisfactory mist suppressors. They tend to merely change the direction of movement of air and mist. Conventional flat mud flaps tend to force air downward toward the road surface and toward both of their side edges. In some cases the air strikes the road surface with sufficient force to pick up water from the surface thereby increasing the quantity of mist and water drops in the air. Air moving out from the outboard side edge of these conventional flat mud flaps blows water and mist out from the side of a vehicle and into the path of other vehicles.

A plurality of parallel vanes 36 are formed on the generally flat mist suppressant surface 34. These parallel vanes 36 form grooves 38. The grooves 38 absorb kinetic energy from the water, water drops, mist, and air that contacts the mist suppressant panels 28 and condenses the minute water droplets into larger drops of water. The condensed water drops flow along the grooves 38 toward the frame 18 and the center of the truck 14. The air that is displaced by the mist suppressant panels 28 assists the flow of condensed water drops along the grooves 38. The water drops are also directed downwardly toward the road surface the truck 14 is traveling upon due to the slight downward incline of the grooves 38. The mounting bar 26 is pivoted relative to the pivot brackets 37 and then locked in place by the bolts 33 to maintain the desired inward and downward inclination of the grooves 38.

Figure 7:
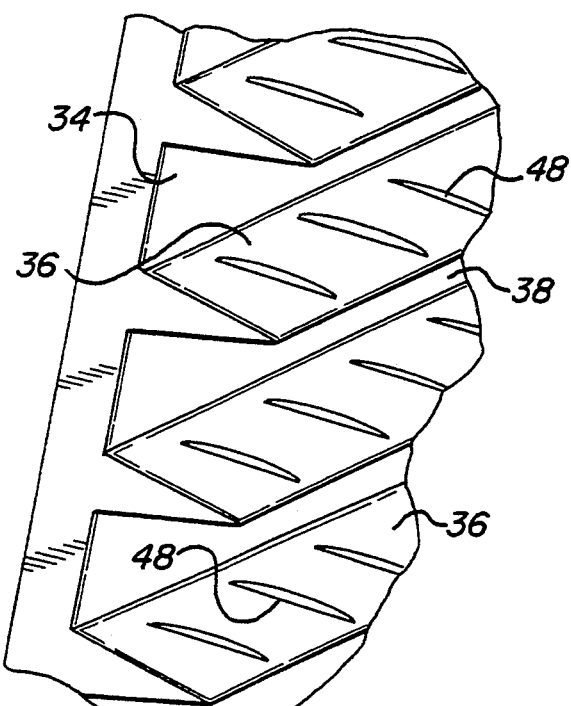
FIG. 7 is an enlarged side elevational view of a portion of one of the mist suppressant panels showing the shape of the vanes.
Figure 8:
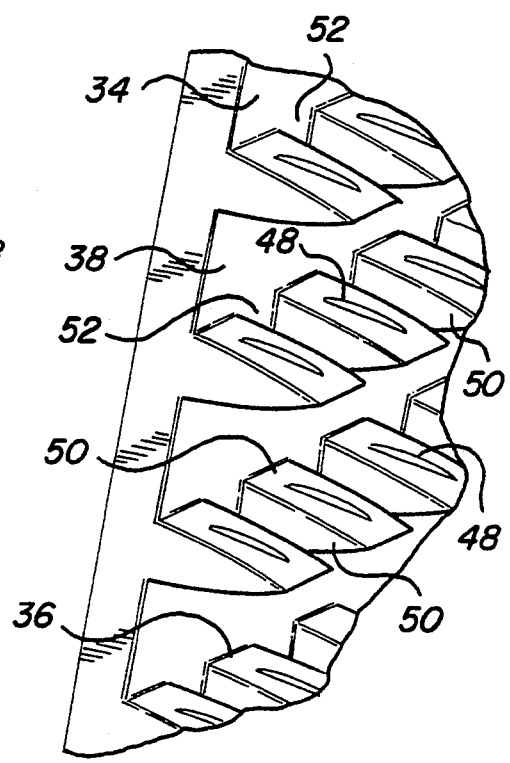
FIG. 8 is a side elevational view similar to FIG. 7 with segmented vanes.
Figure 9:
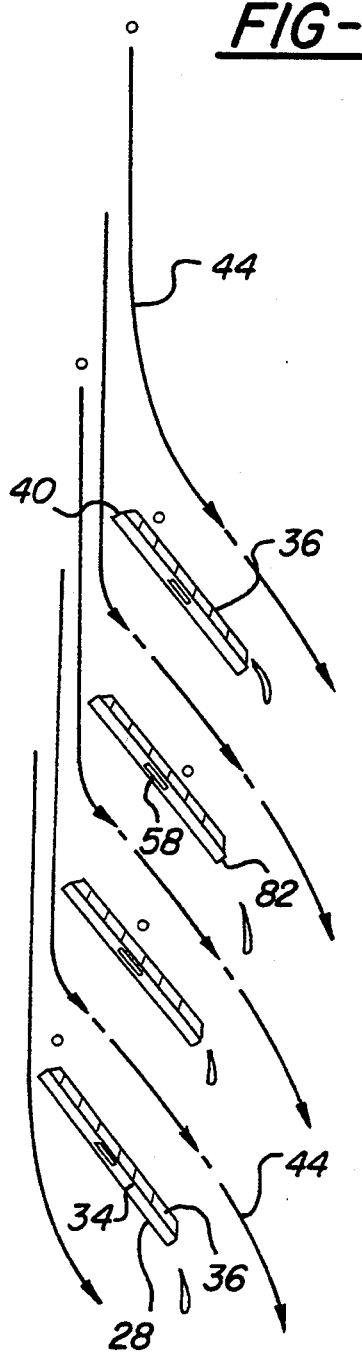
FIG. 9 is a sectional view of a mist suppressant panel system taken along line 9—9 in FIG. 3 without the mounting bar.

Small spoilers 48 can be added to the surfaces of the vanes 36 as shown in FIG. 7. These spoilers, which project outwardly from the surfaces of the vanes 36, increase the absorption of kinetic energy and thereby increase condensation of minute water drops into larger water drops. The spoilers 48 extend partly across each vane 36 and at an angle to the flow of air and water moving along the grooves 38 formed by the vanes 36 on the mist suppressant surface 34. Some kinetic energy is absorbed from water mixed with air striking the surface of the spoilers 48. However, the primary function of the spoilers 48 is to prevent laminar flow and to create turbulent flow along the grooves 38. Turbulent flow causes water droplets to collide with each other, with the surfaces of the vanes 36 and with the mist suppressant surfaces 34. These collisions absorb a substantial amount of kinetic energy and condense small water droplets into larger water drops. The vanes 36 can also be formed by a plurality of vane segments 50 with spaces 52 between the segments as shown in FIG. 8. The spaces 52 between the vane segments 50 increase turbulence, absorb kinetic energy, and condense minute and small water drops into larger drops. The surfaces of the vane segments 50 have integral spoilers 48 that project outwardly from the vane surfaces like the spoilers 48 on the continuous vanes 36 described above.

Figure 5:
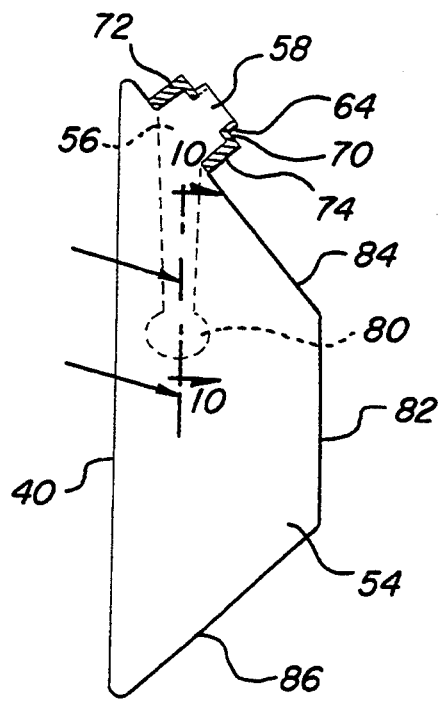
FIG. 5 is an enlarged sectional view of the mounting bar and one of the mist suppressant panels taken along line 5—5 in FIG. 2.
Figure 6:
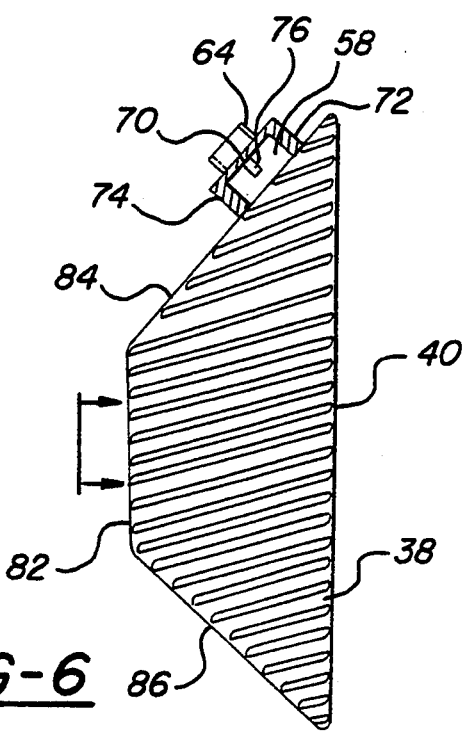
FIG. 6 is an enlarged sectional view of the mounting bar and one of the mist suppressant panels taken along line 6—6 in FIG. 2.
Figure 10:
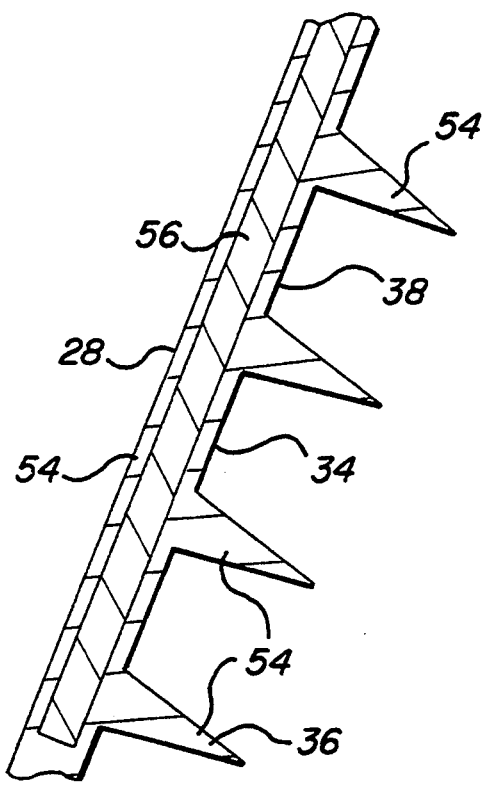
FIG. 10 is an enlarged sectional view taken along line 10—10 in FIG. 5 with parts broken away.

The mist suppressant panels 28 are made from a molded low density thermoplastic resin such as polypropylene 54. Low density polypropylene 54, when molded, forms a tough flexible foam material that retains flexibility at low temperatures. Flexibility at low temperatures makes it possible to remove ice from the mist suppressant panels 28 by striking the panels with a mallet or a similar tool. A tough impervious outer skin is formed on the outer surface of polypropylene 54 during the molding process. A tough flexible skin is required to protect the mist suppressant panels 28 and the polypropylene 54 from sand and gravel and other objects that are frequently encountered on road surfaces. The polypropylene 54 can have a pigment added to provide the desired color on the tough flexible skin or it can be painted. The polypropylene 54 is molded around a mounting bracket 56 as shown in FIG. 10. The mounting bracket 56 is a flat plate that can be almost as large as the mist suppressant panel 28 or it can be a post member as shown in FIG. 5. The mounting bracket 56 can be made from a high density polyethylene or from a suitable metal. The mounting bracket 56 forms a support frame for the molded flexible foam polypropylene 54. A flat blade portion 58 of the mounting bracket 56 extends vertically out of the upper surface of each mist suppressant panel 28. The mounting bar 26 is a channel member with a central portion 70 and side walls 72 and 74 that extend downwardly from the central portion. Slots 62 are formed in the central portion 70 of the mounting bar 26. Excess slots 62 can be provided to accommodate adjustment of the space between mist suppressant panels 28. The blade portion 58 of the mounting bracket 56 of each mist suppressant panel 28 is inserted through one of the slots 62 in the mounting bar 26. If the mounting bracket 56 is metal, tabs 64 on the free end of the blade portion 58 that extend through the slot 62 are bent at 66 and 68 to retain the blade portion 58 of the mounting bracket 56 in the slot 62 in the mounting bar 26. If the mounting bracket 56 is high density polyethylene or a similar thermoplastic resin, the tabs 64 can be bent by heat into the shape shown in FIG. 2. The tabs 64 could also be formed in the bent positions shown in FIG. 2 and forced through the slots 62. The tabs 64 would be forced to straighten as the blade portion 58 of polyethylene is forced through slot 62 and would snap back to the bent position upon being seated in the mounting bar 26. The distance the free end of the blade portion 58 of a mounting bracket 56 extends through the slot 62 can be limited by contact between the mist suppressant panel 28 and the bottom surface of the side walls 72 and 74. The distance the free end of the blade portion 58 extends through the slot 62 can also be limited by providing web members 76 on the blade portion 58 that contact the lower surface of the central portion 70 of the mounting bar 26 as shown in FIG. 6.

The slots 62 through the central portion 70 on the mounting bar 26 are at about a forty-five degree angle to the long axis of the mounting bar. The blade portion 58 of the mounting bracket 56, that is between the outboard side wall 72 and the inboard side wall 74 of the channel shaped mounting bar 26 is also at about a forty-five degree angle to the long axis of the mounting bar and extends from the outboard side wall to the inboard side wall. The mist suppressant panels 28 are held in position and resist a force to the rear by contact between the outboard side wall 72 of the mounting bar 26 and the blade portion 58 of the mounting bracket 56. A force to the front on the mist suppressant panels 28 is resisted by contact between the inboard side wall 74 of the mounting bar 26 and the blade portion 58 of the mounting bracket 56.

The mist suppressant panels 28 could also be attached by welding, by bolts, or other conventional fastener systems. Regardless of the attaching systems used, the mist suppressant panels 28 should yield in the event of an overload. The flat blade portion 58 of the mounting bracket 56 can bend if a large bending load is applied to one of the mist suppressant panels 28 or the tabs 64 can shear from the blade portion 58 if a large tension load is encountered. The mounting bar 26 and vehicle portions that the mounting bar is attached to are generally not damaged as a result of bending or tension forces on the mist suppressant panels 28.

A quick disconnect system can be provided between the mounting bracket 56 and molded polypropylene portions of the mist suppressant panels 28. A knob 80 shown in FIG. 5, for example, could be provided on the lower end of the mounting bracket 56 and positioned in a pocket formed inside the molded polypropylene 54. The resilient polypropylene 54 allows the molded portion of the mist suppressant panel 28 to be snapped onto and separated from the knob 80 of the mounting bracket 56.

The molded mist suppressant panels 28 have an inboard edge 82 that is generally parallel to the outboard edge 40. A top edge 84 extends inwardly and downwardly from a horizontal plane and from the outboard edge 40 to the inboard edge 82. A bottom edge 86 extends inwardly and upwardly from the outboard edge 40 to the inboard edge 82. The grooves 38 formed by the vanes 36 and the generally flat mist suppressant surface 34 have forward ends along the outboard edge 40 and discharge ends along the inboard edge 82, the top edge 84 and the bottom edge 86 as shown in FIG. 6. The discharge ends of the grooves are thus spread along three sides of the perimeter of the mist suppressant panels 28. By spreading the areas where condensed water is discharged from the grooves 38, the tendency of the discharged water drops to be divided into smaller drops and to become entrained in air is decreased. This arrangement of the discharge ends of the grooves increases the discharge area for air that moves along the surface of the mist suppressant panels. The increased discharge area decreases air velocity and turbulence. The decreased air velocity and turbulence decreases the tendency of water drops to be decreased in size and to become entrained in air after they are discharged from the grooves 38.

During movement of the truck 14 or other wheeled vehicles along a wet road surface, the wheels and tires 12 and 16 splash water and mud up from the road surface and water is picked up by the surface of the wheels and tires. The water that is picked up by the surface of the wheels and tires 12 and 16 is thrown from the tires by centrifugal force. The water that is thrown from the wheel and tire by centrifugal force varies from minute drops to large drops to a solid stream depending upon conditions. The minute drops can become entrained in turbulent air created by the moving vehicle. A mist suppressant panel system 10 with a plurality of mist suppressant panels 28 is mounted on the vehicle frame 18 to the rear of each tire and wheel 12 and 16 and some distance above the road surface. Water which is splashed into contact with the mist suppressant panels 28 is deflected inwardly toward the vehicle frame and the center of the vehicle and downwardly toward the road surface. Relatively large water drops that are thrown by the tires and wheels 12 and 16 into contact with the mist suppressant panels 28 are also directed inwardly toward the frame 18 and the center of the truck 14. Vanes 36 on the mist suppressant panels 28 absorb kinetic energy from the relatively large water drops and condense the water drops into even larger water drops. Minute water drops that become mixed with air to form a heavy wet mist are sucked into the mist suppressant panels 28 from the outboard side of the vehicle. The mist suppressant panels 28 condense the minute water drops into larger drops, separate the water drops from the air, and then direct the separated water and the air inwardly toward the frame 18 and downwardly toward the road surfaces.

Preferred embodiments of the invention have been described in detail, but are examples only and the invention is not restricted thereto. It is to be easily understood by those skilled in the art that modifications and variations can easily be made within the scope of the invention.

I claim:

1. A method of suppressing mist created by the wheels and tires of a vehicle moving along a wet road surface including:

mounting a plurality of mist suppressant panels on a vehicle directly to the rear of a vehicle wheel and tire, spaced vertically from the road surface, generally parallel to each other, horizontally spaced apart from front to rear to form a passage for air and mist between adjacent mist suppressant panels and in line with water and water drops thrown from a vehicle wheel and tire by centrifugal force;

absorbing kinetic energy from water drops that impinge on the mist suppressant panels and condensing the water drops into larger drops;

pulling air and entrained water drops from the outboard side of the vehicle;

absorbing kinetic energy from water drops entrained in air pulled from the outboard side of the vehicle to condense the water into larger drops and to separate the water drops from the air; and directing water, water drops, and air inwardly toward the center of the vehicle and directing water and water drops toward the road surface under the center portion of the vehicle.

2. A method of suppressing mist as set forth in claim 1 including providing the mist suppressant panels with a plurality of vanes that form channels, direct air and water in the channels downwardly, rearwardly and inwardly toward the center of the vehicle and that increase condensation of water drops into larger drops.

3. A method of suppressing mist as set forth in claim 2 including providing spoilers on the vanes to increase condensation of water drops.

4. A mist suppressant panel system including a mounting bar adapted to be mounted on a vehicle frame directly to the rear of a vehicle wheel; a plurality of horizontally front to rear spaced mist suppressant panels attached to the mounting bar and each having an outboard edge, an upper edge and a mist suppressant surface which extends downwardly and rearwardly from the upper edge, and rearwardly and inwardly from the outboard edge and wherein a passage for air and mist is formed between two adjacent mist suppressant panels and the mist suppressant surfaces direct air and water toward the center of a vehicle and downward.

5. A mist suppressant panel system as set forth in claim 4 wherein each mist suppressant panel has mist condensing projections on the mist suppressant surface.

6. A mist suppressant panel system as set forth in claim 5 wherein the mist condensing projections on the mist suppressant surface are a plurality of parallel spaced apart vanes.

7. A mist suppressant panel system as set forth in claim 6 further comprising spoilers integral with the surfaces of the vanes.

8. A mist suppressant panel system as set forth in claim 7 wherein the vanes are segmented and the segments are spaced apart.

9. A mist suppressant panel system as set forth in claim 4 wherein each mist suppressant panel includes a molded thermoplastic resin portion that is flexible and has a tough, smooth impervious skin.

10. A mist suppressant panel system as set forth in claim 9 wherein the mist suppressant panels include a color pigment added to the thermoplastic resin prior to molding.

11. A mist suppressant panel system as set forth in claim 5 wherein at least four mist suppressant panels are attached to the mounting bar and three passages for air and mist are formed between the mist suppressant panels.

12. A mist suppressant panel system as set forth in claim 4 wherein each mist suppressant panel includes a mounting bracket with a blade portion that projects through a slot in the mounting bar and tabs on a free end of the blade portion that are in the plane of the blade portion when the blade portion is inserted through said slot and that extend out of the plane of the blade portion and away from the adjacent slot to secure the mounting bracket to the mounting bar.

13. A mist suppressant panel system as set forth in claim 4 wherein the mist suppressant surface of each mist suppressant panel extends downwardly and rearwardly from the upper edge at an angle of about ten degrees from a vertical plane and extends rearwardly and inwardly from an outboard edge at an angle of about forty-five degrees from a vertical plane that is transverse to the direction of vehicle movement and directs mist, water and air under said vehicle behind said vehicle wheel.

14. A mist suppressant panel system as set forth in claim 4 wherein the mounting bar is pivotally mounted on said vehicle frame for pivotal movement about a generally horizontal axis extending the length of the mounting bar, and further comprising a retainer for retaining the mounting bar in a fixed position relative to said vehicle frame with the plurality of horizontally spaced mist suppressant panels in a fixed attitude relative to said vehicle frame.

15. A mist suppressant panel system in combination with a vehicle having a frame supported by front wheels and tires and rear wheels and tires and a driver's compartment attached to the frame; including a generally horizontal mounting bar attached to the vehicle frame at the rear of each wheel and tire; at least four horizontally front to rear spaced apart mist suppressant panels attached to each mounting bar and wherein each mist suppressant panel includes a molded low density thermoplastic resin portion with a foam core, a tough water impervious outer skin, an outboard edge, an inboard edge, a top edge, a bottom edge and a mist suppressant surface; a mounting bracket secured to each molded mist suppressant panel and fastened to the mounting bar to hold the mist suppressant surface in a position in which the outboard edge is directly behind the outboard portion of one of the tires, in a position in which the mist suppressant surface extends downwardly, and in a position in which the mist suppressant surface extends inwardly and rearwardly away from said outboard edge and away from an adjacent wheel and tire; a plurality of parallel vanes on the mist suppressant surface forming grooves that absorb kinetic energy from water drops and condense small water drops into larger water drops; and wherein the grooves that absorb kinetic energy have a first end that is adjacent to the outboard edge, a portion of the grooves have a second end that is adjacent to the inboard edge and a portion of the grooves have a second end that is adjacent to the bottom edge of a mist suppressant panel.

16. A mist suppressant panel system as set forth in claim 15 in which each mounting bracket includes a flat blade portion that passes through a slot in the mounting bar and is retained in the slot.

17. A mist suppressant panel system as set forth in claim 15 in which the mist suppressant surface extends downwardly and rearwardly from the top edge of the mist suppressant panel.

18. A mist suppressant panel system as set forth in claim 15 wherein a portion of the grooves have a second end that is adjacent to the top edge of a mist suppressant panel.

* * * * *